US012506502B2

(12) United States Patent
Jacobsson et al.

(10) Patent No.: US 12,506,502 B2
(45) Date of Patent: Dec. 23, 2025

(54) RADIO TRANSCEIVER DEVICE CONFIGURED FOR DITHERING OF A RECEIVED SIGNAL

(71) Applicant: Telefonaktiebolaget LM Ericsson (publ), Stockholm (SE)

(72) Inventors: Sven Jacobsson, Västra Frölunda (SE); Lise Aabel, Gothenburg (SE); Ibrahim Can Sezgin, Surte (SE); Christian Fager, Mölnlycke (SE); Mikael Coldrey, Borås (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 391 days.

(21) Appl. No.: 17/622,996

(22) PCT Filed: Jun. 28, 2019

(86) PCT No.: PCT/SE2019/050638
§ 371 (c)(1),
(2) Date: Dec. 27, 2021

(87) PCT Pub. No.: WO2020/263142
PCT Pub. Date: Dec. 30, 2020

(65) Prior Publication Data
US 2022/0271786 A1   Aug. 25, 2022

(51) Int. Cl.
*H04B 1/12* (2006.01)
*H04B 1/40* (2015.01)

(52) U.S. Cl.
CPC ............ *H04B 1/123* (2013.01); *H04B 1/40* (2013.01)

(58) Field of Classification Search
CPC .......... H04B 1/40; H04B 1/44; H04B 1/0007; H04B 1/0028; H04B 1/10; H04B 1/12;
(Continued)

(56) References Cited

U.S. PATENT DOCUMENTS 4,812,846 A * 3/1989 Noro ................. H04B 14/046
341/131
5,493,298 A * 2/1996 Bartz ................. H03M 1/201
341/131
(Continued)

FOREIGN PATENT DOCUMENTS

EP    2 913 890 A1    9/2015
JP    2006093870 A    4/2006

OTHER PUBLICATIONS

International Search Report and Written Opinion issued in International Application No. PCT/SE2019/050638 dated Apr. 6, 2020 (14 pages).
(Continued)

*Primary Examiner* — Quochien B Vuong
(74) *Attorney, Agent, or Firm* — Rothwell, Figg, Ernst & Manbeck, P.C.

(57) ABSTRACT

There is provided a radio transceiver device. The radio transceiver device comprises an antenna. The radio transceiver device further comprises a signal processing module. The radio transceiver device further comprises a receiver chain configured to receive a first signal. The receiver chain extends from the antenna to the signal processing module and at least comprises an analog-to-digital converter (ADC), and is thereby configured to receive a first signal from the antenna and provide the first signal to the signal processing module after application of analog-to-digital conversion in the ADC to the first signal. The radio transceiver device further comprises a transmitter chain. The transmitter chain extends from the signal processing module to the antenna and at least comprises a digital-to-analog converter (DAC), and is thereby configured to receive a second signal from the signal processing module and provide the second signal to the antenna after application of digital-to-analog conversion in the DAC. The DAC is configured to generate a dither (Continued)

signal and is connected to the receiver chain for application of the dither signal to the first signal before application of analog-to-digital conversion in the ADC to the first signal.

17 Claims, 9 Drawing Sheets

(58) Field of Classification Search
CPC ......... H04B 1/123; H04B 1/525; H03M 1/00; H03M 1/001; H03M 1/006; H03M 1/08
See application file for complete search history.

(56) References Cited

U.S. PATENT DOCUMENTS

| | | | | | |
|---|---|---|---|---|---|
| 5,835,158 | A | * | 11/1998 | Lowe | H03M 1/0639 341/131 |
| 6,173,003 | B1 | * | 1/2001 | Whikehart | H04B 1/10 708/250 |
| 6,326,911 | B1 | * | 12/2001 | Gomez | H03M 3/33 341/131 |
| 7,015,851 | B1 | * | 3/2006 | Bruhns | H03M 1/0641 341/131 |
| 8,823,565 | B2 | * | 9/2014 | Kimura | H03M 3/328 341/131 |
| 9,094,081 | B1 | * | 7/2015 | Steinbrecher | H04B 1/0014 |
| 9,998,275 | B1 | * | 6/2018 | Pritsker | H04B 1/12 |
| 10,790,850 | B1 | * | 9/2020 | Lin | H03M 3/33 |
| 10,924,257 | B2 | * | 2/2021 | Jung | H04B 1/123 |
| 2008/0261638 | A1 | * | 10/2008 | Wahab | H03M 1/0639 455/500 |
| 2013/0249720 | A1 | | 9/2013 | Matsuura et al. | |
| 2018/0048377 | A1 | | 2/2018 | Gustavsson et al. | |

OTHER PUBLICATIONS

Puglielli, A., "Design of Energy- and Cost-Efficient Massive MIMO Arrays," IEEE Mar. 2016 (21 pages).
Ho, David K. W. et al., "Antithetic Dithered 1-Bit Massive MIMO Architecture: Efficient Channel Estimation via Parameter Expansion and PML", IEEE Transactions on Signal Processing, vol. 67, No. 9, May 2019 (pp. 2291-2303).
Jacobsson, Sven., et al., "Massive MU-MIMO-OFDM Uplink with Direct RF-Sampling and 1-Bit ADCs", arXiv:1907.07091v1 [cs.IT], Jul. 2019 (6 pages).
Liu, J., et al., "Low-Resolution ADCs for Wireless Communication: A Comprehensive Survey", IEEE Access, vol. 7, Jul. 2019 (pp. 91291-91324).
Jacobsson, S., et al., "Throughput Analysis of Massive MIMO Uplink With Low-Resolution ADCs", IEEE Transactions on Wireless Communications, vol. 16, No. 6, Jun. 2017 (pp. 4038-4051) (14 pages).
Jacobsson, S., et al., "Quantized Precoding for Massive MU-MIMO", IEEE Transactions on Wireless Communications, vol. 65, No. 11, Nov. 2017 (pp. 4670-4684) (15 pages).
Sezgin, I. C., et al., "A Low-Complexity Distributed-MIMO Testbed Based on High-Speed Sigma-Delta-Over-Fiber", IEEE Transactions on Microwave Theory and Techniques, 2019 (pp. 1-12).
Prata A., et al., "All-digital Flexible Uplink Remote Radio Head for C-RAN", IEEE, 2016 (4 pages).

* cited by examiner

RADIO TRANSCEIVER DEVICE CONFIGURED FOR DITHERING OF A RECEIVED SIGNAL

CROSS REFERENCE TO RELATED APPLICATION

This application is a 35 U.S.C. § 371 National Stage of International Patent Application No. PCT/SE2019/050638, filed Jun. 28, 2019.

TECHNICAL FIELD

Embodiments presented herein relate to a radio transceiver device, a radio access network node, and a terminal device. Embodiments presented herein further relate to a method, a computer program, and a computer program product for receiving a signal using the radio transceiver device.

BACKGROUND

In massive multiple-input multiple-output (MIMO), the radio base-station (RBS) is equipped with a large number (e.g., hundreds) of antenna elements to serve a number (e.g., tens) of user equipment (UE) in the same time-frequency resource. This enables significant gains in spectral efficiency and energy efficiency. To fully exploit the gains provided by the large antenna array in massive MIMO, each antenna element might be equipped with set of analog-to-digital converters (ADCs) and digital-to-analog converters (DACs). Such architectures will hereinafter be referred to as digital-beamforming architectures. The digital-beamforming architecture is implemented in a radio transceiver device. However, in order to keep costs and power consumption within tolerable limits when scaling up the number of antenna elements in such digital-beamforming architectures, and thus in the radio transceiver device, low-precision (e.g., 1-6 bits) ADCs and DACs may have to be used at the RBS. This inevitably leads to reduced system performance. Massive MIMO is robust, to some extent, towards the use of low-resolution ADCs and DACs at the RBS.

Most available analyses of the use of low-precision data converters (i.e., ADCs and DACs) in massive MIMO have considered the case of direct-conversion transceivers at the RBS, where mixers are required at each antenna element to perform down-conversion and up-conversion of the radio frequency (RF) signal to baseband, and vice versa. In the receiver part of a direct-conversion transceiver, the in-phase (I) and quadrature (Q) components of the received signal are converted from the analog domain into the digital domain using a pair of ADCs; one for the I component and one for the Q component. Conversely, in the transmitter part of a direct-conversion transceiver, the I and Q components of the transmit signal are generated by a pair of DACs; one for the I component and one for the Q component.

Recent advances in data-converter technology have opened up the possibility to design radio transceivers that samples the RF signal almost directly at the antenna, without the need of analog up-conversion and down-conversion. In such RF-sampling transceivers, by bringing high-speed ADCs and DACs physically closer to the antenna, much of the conventional RF circuitry (e.g., oscillators, filters and, mixers) is replaced by a digital signal processor (DSP). RF-sampling transceivers also bring more flexibility as the desired signal can be processed in the digital domain, whereas conventional direct-conversion transceivers have to be tailored for a particular carrier frequency. In RF-sampling transceivers, the sampling rate of the ADCs and DACs is in the order of several Giga samples per second (GS/s). Since the power consumption of ADCs and DACs scale roughly linearly with the sampling rate and exponentially with the resolution (i.e. with the number of bits), low-precision ADCs and DACs for RF-sampling systems, not only for massive MIMO systems but also for single-input single-output (SISO) systems and small-scale MIMO systems have been designed. For example, a 1-bit RF-sampling transmitter design and a 1-bit RF-sampling receiver design have been proposed.

Taking time-division duplexing (TDD) operation in a massive MIMO up-link (UL) system, i.e., when the UEs transmit to the RBS, as an example, it is known that operating at high signal-to-noise ratio (SNR) may lead to a performance degradation in some scenarios when low-resolution (e.g., 1-bit) ADCs are used at the RBS. For example, it is not possible to support M-quadrature amplitude modulation (QAM) constellations, for M>4, under certain channel conditions.

Further, as the UEs become more and more advanced, also the UEs might be provided with a similar digital-beamforming architecture as the RBS.

Hence, there is still a need for improved digital-beamforming architectures, and thus improved radio transceiver devices.

SUMMARY

An object of embodiments herein is to provide a radio transceiver device not suffering from the issues noted above (e.g. performance degradation), or at least where the above noted issues have been mitigated or reduced.

According to a first aspect there is presented a radio transceiver device. The radio transceiver device comprises an antenna. The radio transceiver device further comprises a signal processing module. The radio transceiver device further comprises a receiver chain configured to receive a first signal. The receiver chain extends from the antenna to the signal processing module and at least comprises an analog-to-digital converter (ADC), and is thereby configured to receive a first signal from the antenna and provide the first signal to the signal processing module after application of analog-to-digital conversion in the ADC to the first signal. The radio transceiver device further comprises a transmitter chain. The transmitter chain extends from the signal processing module to the antenna and at least comprises a digital-to-analog converter (DAC), and is thereby configured to receive a second signal from the signal processing module and provide the second signal to the antenna after application of digital-to-analog conversion in the DAC. The DAC is configured to generate a dither signal and is connected to the receiver chain for application of the dither signal to the first signal before application of analog-to-digital conversion in the ADC to the first signal.

Advantageously this radio transceiver device does not suffer from the issues noted above.

Advantageously the proposed radio transceiver device yields improved mean-squared error (MSE) performance and enables successful detection of high-order constellations (e.g., 64-QAM) even if equipped with low-precision hardware (e.g., 1-bit ADCs).

According to a second aspect there is presented a radio access network node comprising a radio transceiver device according to the first aspect.

According to a third aspect there is presented terminal device comprising a radio transceiver device according to the first aspect.

Advantageously the proposed radio transceiver device enables efficient use of low-precision hardware (not limited only to low-precision ADCs) in a communication device such as a radio access network node or a terminal device, which reduces the overall cost and power consumption of the communication device.

According to a fourth aspect there is presented a method for receiving a first signal using a radio transceiver device according to the first aspect. The method comprises receiving the first signal at the antenna. The method comprises applying the dither signal to the first signal before the application of analog-to-digital conversion in the ADC to the first signal. The method comprises providing the first signal to the signal processing module after applying the dither signal and after the application of analog-to-digital conversion in the ADC to the first signal.

According to a fifth aspect there is presented a computer program for receiving a first signal using a radio transceiver device according to the first aspect, the computer program comprising computer program code which, when run on a radio access network node of the second aspect or a terminal device of the third aspect, causes the radio access network node or the terminal device to perform a method according to the fourth aspect.

According to a sixth aspect there is presented a computer program product comprising a computer program according to the fifth aspect and a computer readable storage medium on which the computer program is stored. The computer readable storage medium could be a non-transitory computer readable storage medium.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
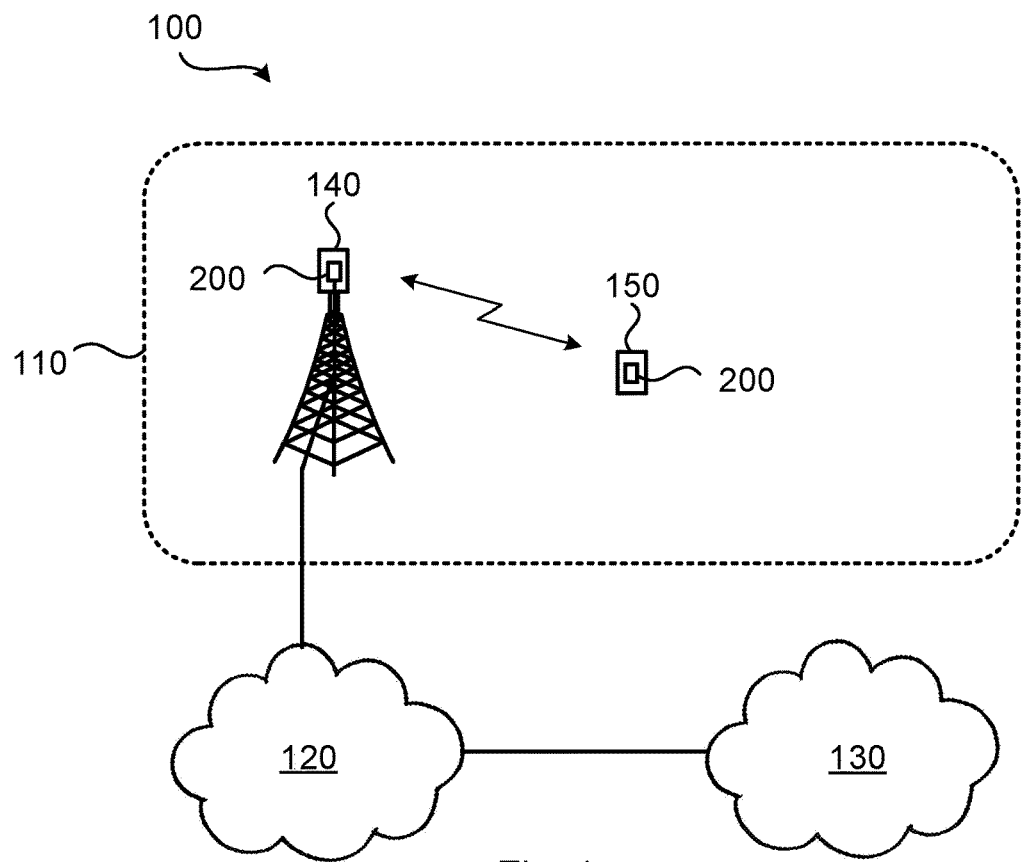
FIG. 1 is a schematic diagram illustrating a communications network according to embodiments.

FIG. 1 is a schematic diagram illustrating a communications network 100 where embodiments presented herein can be applied. The communications network 100 comprises a radio access network node 140 configured to provide network access over one or more radio propagation channels to a terminal device 150 in a radio access network 110. Non-limited examples of terminal devices 150 are portable wireless devices, mobile stations, mobile phones, handsets, wireless local loop phones, user equipment (UE), smartphones, laptop computers, tablet computers, network equipped sensors, network equipped vehicles, and Internet of Things (IoT) devices. In some embodiments the radio access network node 140 is part of, integrated with, or collocated with a radio base station, base transceiver station, node B, evolved node B, gNB, access point, or the like. The radio access network 110 is operatively connected to a core network 120. The core network 120 is in turn operatively connected to a packet data network 130, such as the Internet. The terminal device 150 is thereby, via the radio access network node 140, enabled to access services of, and exchange data with, the service network 130. Each of the radio access network node 140 and the terminal device 150 comprises a respective radio transceiver device 200.

As noted above, there is still a need for improved digital-beamforming architectures, and thus improved radio transceiver devices 200. The above noted issue of performance degradation can be mitigated to some extent by dithering (i.e., by intentionally adding noise prior to quantizing the received signal using the low-resolution ADCs). Implementing dithering functionality at the receiver, however, requires equipping the radio transceiver device 200 with additional hardware circuitry and, hence, incur additional costs and circuit power consumption. This issue is especially significant for massive MIMO systems employing large antenna arrays (and, hence, a large number of ADCs), and for RF-sampling systems in which the ADCs and the dither source (e.g., a plurality of DACs) need to operate at high sampling rates.

The embodiments disclosed herein therefore relate to a radio transceiver device 200, where the radio transceiver device 200 is configured for dithering of a received signal in an efficient manner. Embodiments disclosed herein further relate to a method performed by communication device 140a, 150, such as a radio access network node 140 or a terminal device 150 comprising the radio transceiver device 200 for receiving a dithering a signal. Embodiments disclosed herein further relate to a computer program product comprising code, for example in the form of a computer program, that when run on a communication device 140a, 150, such as a radio access network node 140 or a terminal device 150 comprising the radio transceiver device 200, causes the communication device 140, 150 comprising the radio transceiver device 200 to perform the method.

Figure 2:
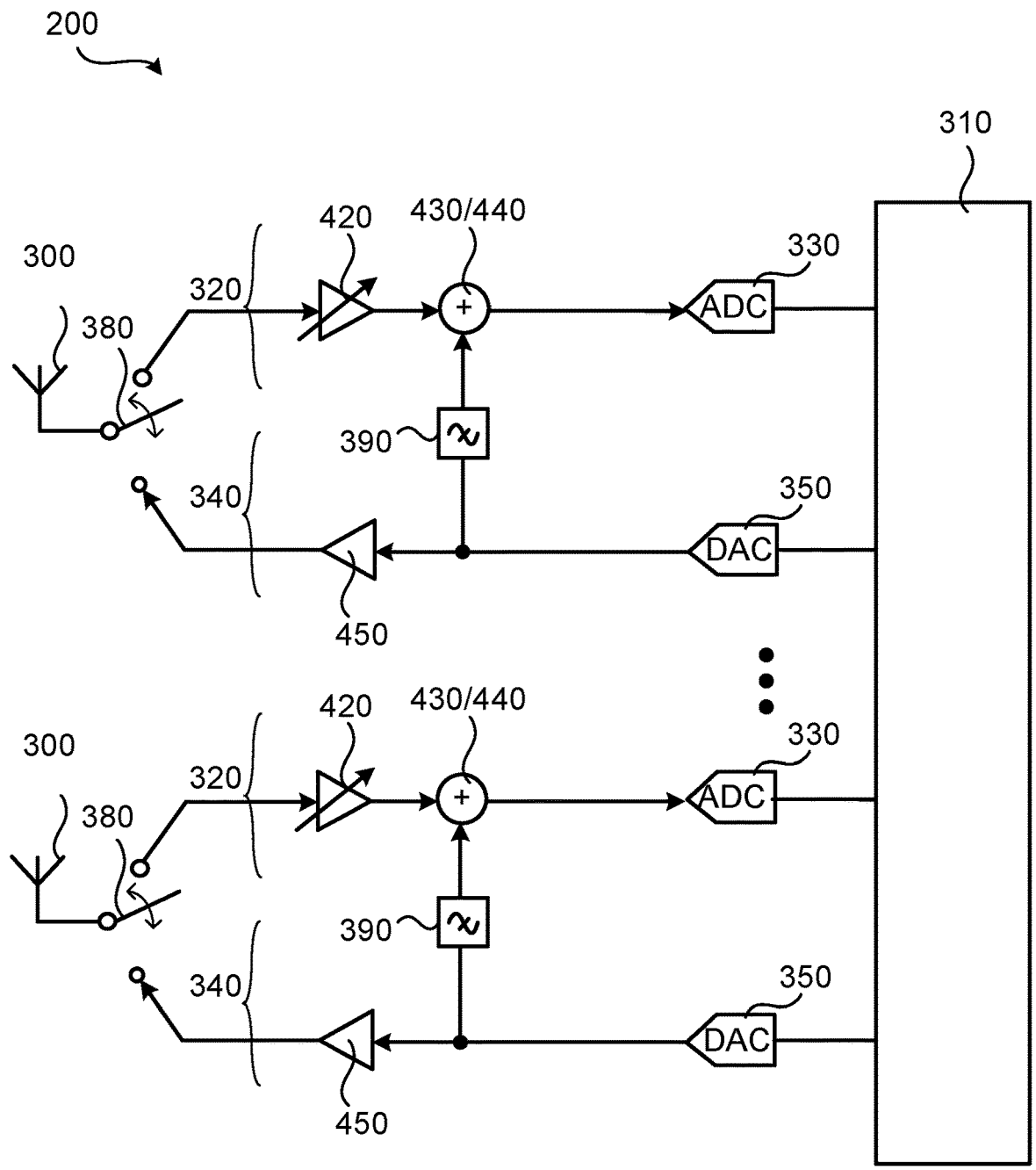
FIGS. 2, 3, and 4 schematically illustrate radio transceiver devices according to embodiments.
Figure 3:
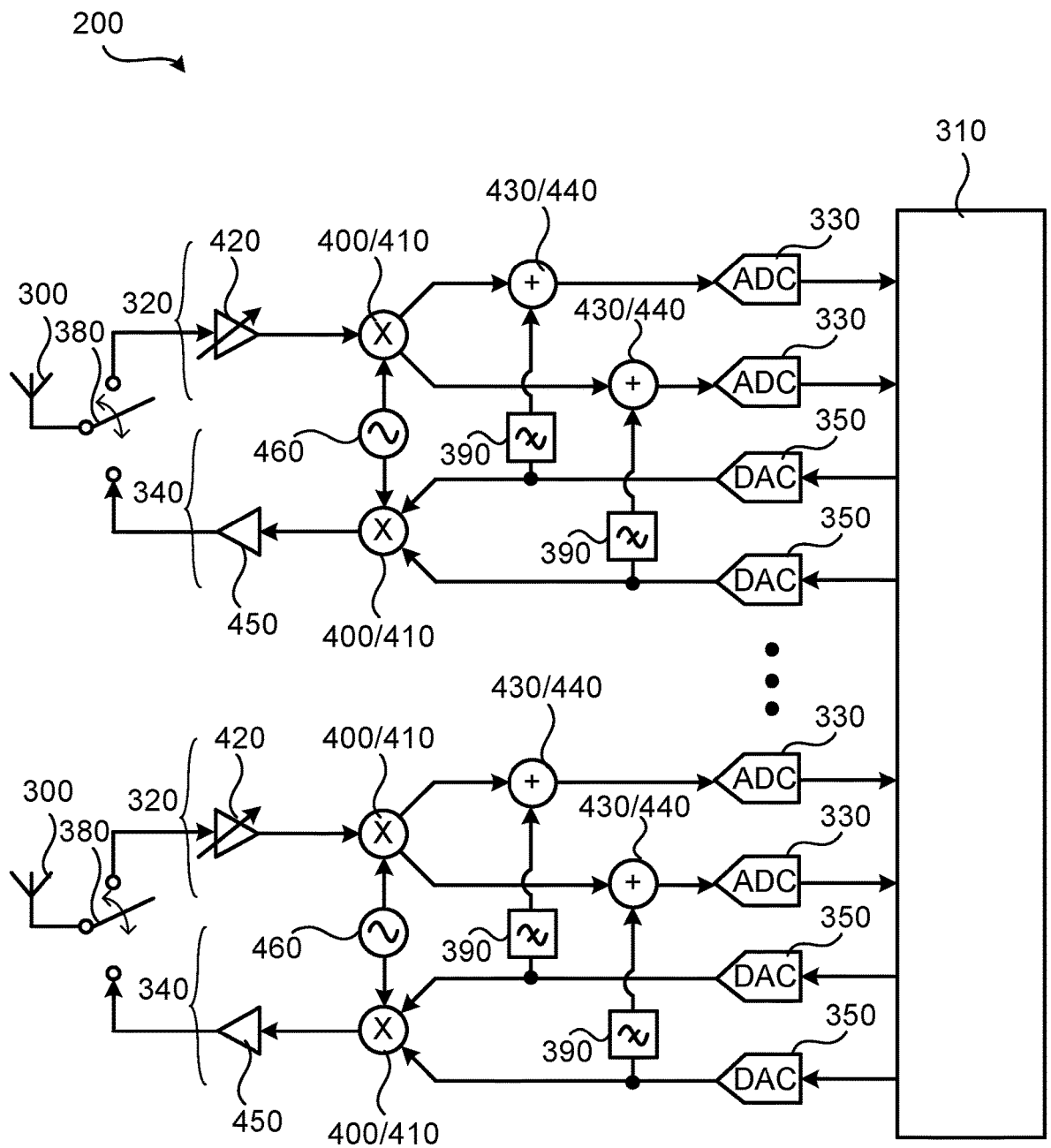
Figure 4:
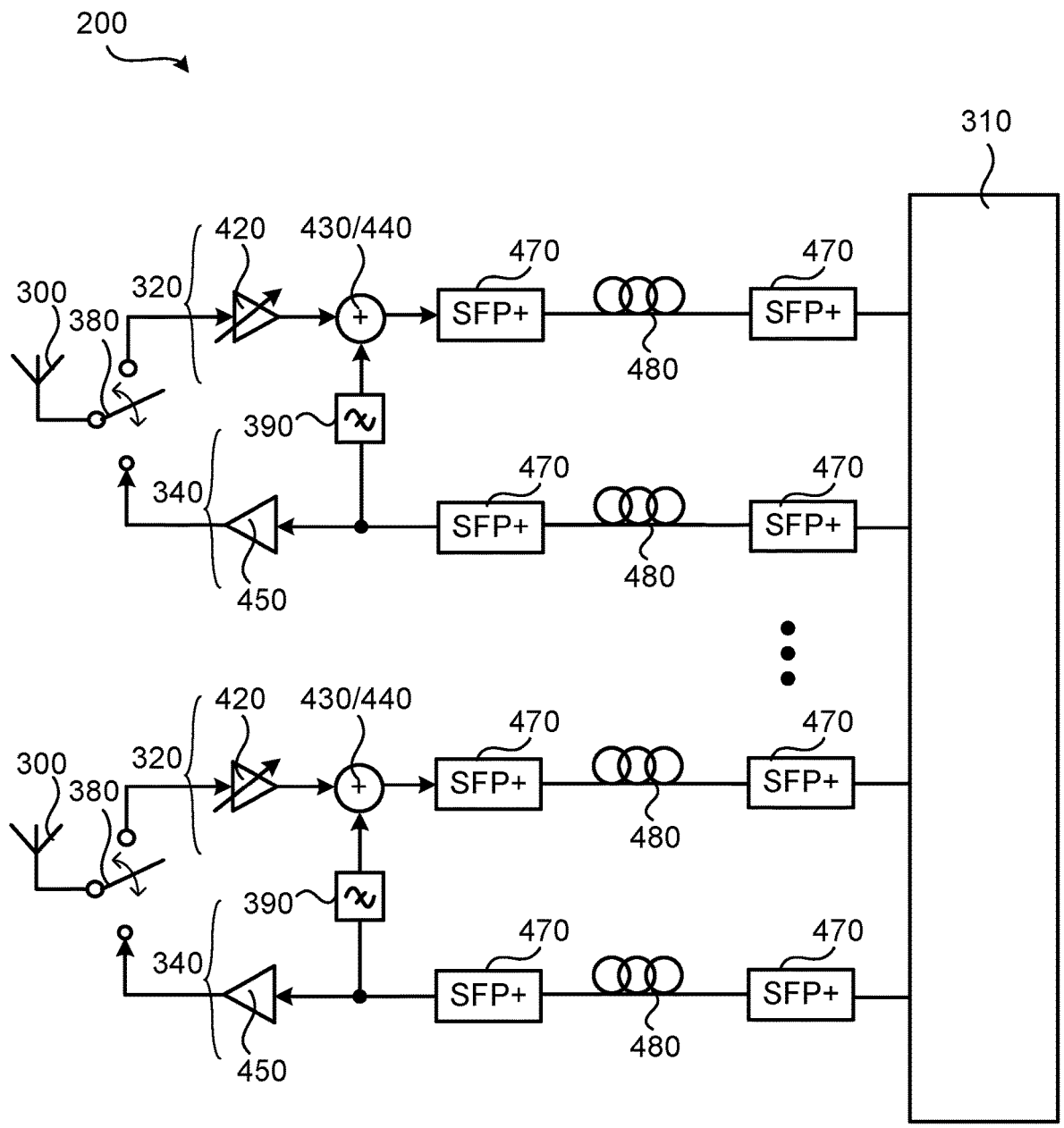

Parallel reference will now be made to FIG. 2, FIG. 3, and FIG. 4 which illustrate a radio transceiver device 200 according to embodiments disclosed herein.

The radio transceiver device 200 comprises an antenna 300. The antenna might be part of an antenna array. The antenna array might be a linear array or a two-dimensional array. The radio transceiver device 200 further comprises a signal processing module 310. The signal processing module 310 might be a DSP and be configured to operate either in baseband, in intermediate frequency, in radio frequency, or any combination thereof, depending on the type of radio transceiver device 200.

The radio transceiver device 200 further comprises a receiver chain 320. The receiver chain 320 is configured to receive a first signal. The receiver chain 320 extends from the antenna 300 to the signal processing module 310. The receiver chain 320 at least comprises an ADC 330. The receiver chain 320 is thereby configured to receive a first signal from the antenna 300 and provide the first signal to the signal processing module 310 after application of analog-to-digital conversion in the ADC 330 to the first signal. Examples of further components of the receiver chain 320 will be provided below.

The radio transceiver device 200 further comprises a transmitter chain 340. The transmitter chain 340 extends from the signal processing module 310 to the antenna 300. The transmitter chain 340 at least comprises a DAC 350. The transmitter chain 340 is thereby configured to receive a second signal from the signal processing module 310 and provide the second signal to the antenna 300 after application of digital-to-analog conversion in the DAC 350. Examples of further components of the transmitter chain 340 will be provided below.

The DAC 350 is configured to generate a dither signal. The DAC 350 is connected to the receiver chain 320 for application of the dither signal to the first signal before application of analog-to-digital conversion in the ADC 330 to the first signal.

Such a radio transceiver device 200 enables a hardware-efficient and low-cost implementation of dithering of a received signal, for example during the uplink phase of a TDD system (if the radio transceiver device 200 is provided in a radio access network node 140 and is configured for TDD operation) by reusing already-existing hardware circuitry found in the transmitter chain 340 of the radio transceiver device 200 which during TDD operation commonly is used only during the downlink phase (if the radio transceiver device 200 is provided in a radio access network node 140). Specifically, the dither signal, which is added to the received signal in the analog domain prior to the ADC 330, is generated by the DAC 350 used also in the transmitter chain 340.

Embodiments relating to further details of the radio transceiver device 200 will now be disclosed.

According to some aspects, the power of the dither signal is a function of the power of the received signal (i.e., of the first signal). This can be achieved by using automatic gain control (AGC) and a variable-gain amplifier (VGA) at each antenna element of the receiver. If the radio transceiver device is a multi-antenna radio transceiver device and thus the antenna 300 is part of an antenna array, an estimate of the received power could be obtained using only one or few AGCs for the entire antenna array of the radio transceiver device 200. Hence, according to an embodiment the radio transceiver device 200 further comprises a signal power adjuster (such as an AGC or a VGA). The DAC 350 might then be connected to the receiver chain 320 via the signal power adjuster. Further, the dither signal is power adjusted by the signal power adjuster before being applied to the first signal. In some embodiments the dither signal is power adjusted as a function of the power of the first signal.

According to some aspects, the dither signal, generated by the DAC 350, is made dependent on previous samples of the received signal (i.e., of the first signal) after quantization by the ADC 330 and after being processed by the signal processing module 310. Hence, according to an embodiment, application of the ADC 330 results in samples of the first signal being produced, and the radio transceiver device 200 implements a feedback mechanism, where the dither signal is, via the feedback mechanism, made dependent on previous samples of the first signal. The feedback mechanism might be implemented in the signal processing module 310.

According to some aspects, the sampling rate and/or the resolution (i.e., the number of bits) of the ADC 330 (in the receiver chain 320) and the DAC 350 (in the transmitter chain 340) need not be equal. In some non-limiting examples, the DAC 350 has higher sampling rate and/or the resolution than the ADC 330. For example, the ADC 330 might be a 1-bit ADC.

According to some aspects, the dither signal, generated by the DAC 350, is processed in the analog domain (for example, by means of filtering and/or passing through a nonlinear device) before being combined with the received signal (i.e., with the first signal). Hence, according to an embodiment the radio transceiver device 200 further comprises a filter 390. The DAC 350 might then be connected to the receiver chain 320 via the filter 390. The dither signal might then be filtered by the filter 390 before being applied to the first signal. There could be different types of filters 390. For example, the filter 390 could be any of: a low-pass filter, a high-pass filter, a band-pass filter, or a band-stop filter. For example, if the first signal occupies a given frequency band, it might be desirable that the dither signal occupies some other frequency band (to not interfer with the first signal). This can be achieved by filtering. Furthermore, filtering might have an impact on the probability distribution of the dither signal, which can be beneficial in some scenarios in which the amplitude levels supported by the DAC 350 is constrained. In some aspects, the filter 390 is designed to be dependent on the received signal (i.e., on the first signal). In particular, in some embodiments the filter 390 has a filter response that is dependent on properties of the first signal.

There could be different ways for the dither signal to be generated.

In some aspects, the dither signal equals the second signal (i.e., the signal to be transmitted) as outputted from the DAC 350. That is, according to an embodiment, the dither signal is defined by the second signal after application of digital-to-analog conversion in the DAC 350 to the second signal.

In other aspects, the dither signal is generated in the DAC 350 from another signal than the second signal. This another signal is hereinafter denoted an auxiliary signal. That is, according to an embodiment, the DAC 350 is configured to generate the dither signal by performing digital-to-analog conversion of an auxiliary signal being fed to the DAC 350.

Regardless if the dither signal equals the second signal as outputted from the DAC 350 or is generated in the DAC 350 from another signal than the second signal, the dither signal might be subjected to filtering by the filter 390 as disclosed above.

The dither signal might be subtractive dither (SD) or non-subtractive dither (NSD). That is, according to an embodiment, the dither signal represents SD or NSD. For the case of SD, the dither signal (or a function thereof) is subtracted from the quantized signal in the signal processing module 310 unit. For the case of NSD, the dither signal (or a function thereof) is not subtracted from the quantized signal in the signal processing module 310.

In general terms, the first signal as received from the antenna 300 by the receiver chain 320 is in the radio frequency domain. There could be different places in the radio transceiver device 200 where the first signal is converted from the radio frequency domain to the baseband domain (and where the second signal is converted from the baseband domain to the radio frequency domain). Hence, there could be different types of radio transceiver devices 200.

For example, the radio transceiver devices 200 might be implemented as a direct frequency domain transceiver in which signals are not up/down-converted between the antenna 300 and the signal processing module 310. The signal processing module 310 then operates at least in the radio frequency domain and the baseband domain. Hence, according to an embodiment, the dither signal is applied to the first signal in the radio frequency domain. Such an embodiment of a radio transceiver device 200 is illustrated in FIG. 2 and in FIG. 4.

For example, the radio transceiver device 200 might be implemented as a heterodyne transceiver in which signals are up/down-converted to an intermediate frequency between the antenna 300 and the signal processing module 310. The signal processing module 310 then operates in the intermediate frequency domain and the baseband domain. In particular, according to an embodiment, the radio transceiver device 200 further comprises an intermediate frequency mixer 400. The intermediate frequency mixer 400 is placed in the receiver chain 320. The intermediate frequency mixer 400 is configured to convert the first signal from the radio frequency domain to intermediate frequency domain. The dither signal is then applied to the first signal in the intermediate frequency domain. The intermediate frequency mixer 400 might be operated by an oscillator 460. Such an embodiment of a radio transceiver device 200 is illustrated in FIG. 3.

For example, the radio transceiver device 200 might be implemented as a direct-conversion transceiver (also denoted homodyne, synchrodyne, or zero-IF transceiver) in which signals are directly up/down-converted between the radio frequency domain and the baseband domain between the antenna 300 and the signal processing module 310. The signal processing module 310 then operates only in the baseband domain. In particular, according to an embodiment, the radio transceiver device 200 further comprises a radio frequency mixer 410. The radio frequency mixer 410 is placed in the receiver chain 320. The radio frequency mixer 410 is configured to convert the first signal from the radio frequency domain to baseband frequency domain. The dither signal is then applied to the first signal in the baseband frequency domain. The radio frequency mixer 410 might be operated by an oscillator 460. Such an embodiment of a radio transceiver device 200 is illustrated in FIG. 3.

In some examples the radio transceiver device 200 further comprises a low-noise amplifier (LNA) 420. The LNA 420 is placed in the receiver chain 320 between the antenna 300 and the ADC 330. In some examples the radio transceiver device 200 further comprises a power amplifier (PA) 450. The PA 450 is placed in the transmitter chain 340 between the antenna 300 and the DAC 350. In some embodiments the dither signal is applied to the first signal after application of the LNA 420 to the first signal, and in other embodiments the dither signal is applied to the first signal before application of the LNA 420 to the first signal. For example, If the LNA 420 is highly nonlinear it will introduce significant nonlinear distortion. This distortion will be correlated with the first signal, which can be performance-limiting in some scenarios (e.g., in large antenna arrays where uncorrelated noise is averaged out whereas correlated noise is not). This correlation can be decreased by means of dithering before the LNA 420, which can lead to improved performance. If any nonlinear distortion caused by the LNA 420 is insignificant compared to the nonlinear distortion caused by the ADC 330, the dither signal could be applied to the first signal after the LNA 420.

There could be different ways in which the dither signal is applied to the received signal (i.e., to the first signal). In general terms, the dither signal might be applied to the received signal (i.e., to the first signal) in any linear or nonlinear fashion.

According to a first example, the dither signal is applied by means of addition. That is, according to some embodiments, the radio transceiver device 200 further comprises a combiner 430. The DAC 350 is connected to the receiver chain 320 at the combiner 430, and wherein the dither signal is applied to the first signal by, in the combiner 430, being added to the first signal.

According to a second example, the dither signal is applied by means of multiplication. That is, according to some embodiments, the radio transceiver device 200 further comprises a mixer 440. The DAC 350 is connected to the receiver chain 320 at the mixer 440. The dither signal is applied to the first signal by, in the mixer 440, being multiplied to the first signal.

In some aspects the dither signal is applied by being fed to a differential input port of the ADC 330. That is, according to an embodiment, the ADC 330 comprises a comparator with differential input ports, and the dither signal is applied to the first signal by being fed to one of the differential input ports. Such an ADC 330 might be realized by a 1-bit ADC 330.

There could be different ways in which the radio transceiver device 200 is configured to operate. For example, the radio transceiver device 200 might be configured for either TDD operation or frequency-division duplex (FDD) operation. That is, according to some embodiments, the radio transceiver device 200 might be configured for TDD operation such that no second signal representing a message to be transmitted is provided to the antenna 300 when the first signal is provided to the signal processing module 310, and vice versa. To prevent the dither signal from being transmitted over the air, an UL/DL switch 380 may be installed in the transmitter chain 340 (e.g., between the DAC 350 and the antenna 300). According to other embodiments, the radio transceiver device 200 is configured for FDD operation such that the second signal is provided to the antenna 300 when the first signal is provided to the signal processing module 310.

In some aspects the receiver chain 320 and the transmitter chain 340 are implemented using radio-over-fiber (ROF) and thus the antenna 300 and the signal processing module 310 are at least partly connected over optical fiber links 480. Each optical fiber link 480 is at each end terminated by an enhanced small form-factor pluggable transceiver (SFP+) 470. Such an embodiment of a radio transceiver device 200 is illustrated in FIG. 4. The functionality of the aforementioned ADCs 330 and DACs 350 might then be provided by the SFP+ 470. Alternatively, the radio transceiver device 200 of FIG. 4 comprises ADCs 330 provided in the receiver chain 320 between the antenna 300 and the LNA 320 and DACs 350 provided in the transmitter chain 340 between the antenna 300 and the PA 450. However, for the purpose and scope of the herein disclosed embodiments, each SFP+ 470 is considered to be equal to the aforementioned ADCs 330 and DACs 350, where appropriate.

Figure 5:
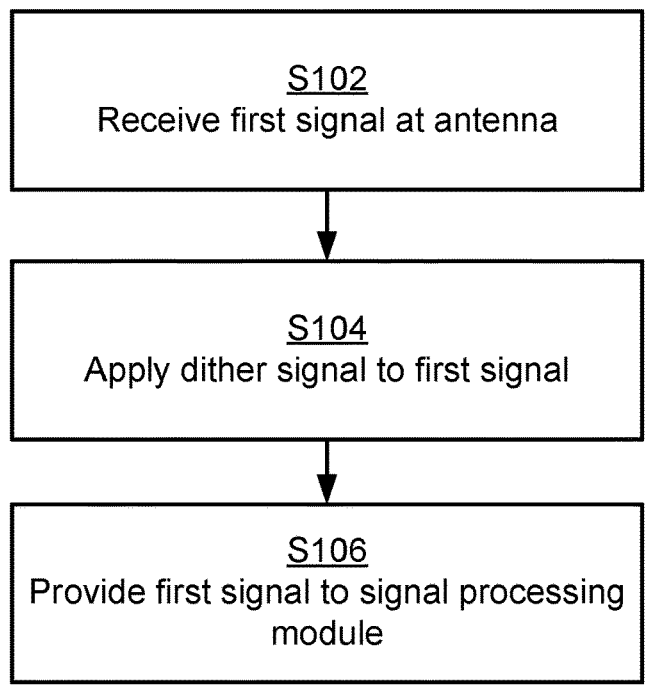
FIG. 5 is a flowchart of a method according to an embodiment.

FIG. 5 is a flowchart illustrating embodiments of a method for receiving a first signal using a radio transceiver device 200 according to any of the above disclosed embodiments. The methods are advantageously performed by communication device 140a, 150, such as a radio access network node 140 or a terminal device 150, comprising the radio transceiver device 200. The method is advantageously provided as a computer program 1420.

S102: The first signal is received at the antenna 300.

S104: The dither signal is applied to the first signal before the application of analog-to-digital conversion in the ADC 330 to the first signal.

S106: The first signal is provided to the signal processing module 310 after the dither signal has been applied and after analog-to-digital conversion in the ADC 330 has been applied to the first signal.

Numerical examples will be presented next to compare the proposed radio transceiver device 200 to state-of-the-art low-precision radio transceiver devices. The numerical examples are given for a radio transceiver device 200 provided in a radio access network node 140 and using RF-sampling in which 1-bit ADCs 330 are used to quantize the received signal during the uplink phase and in which 1-bit DACs 350 are used to generate the transmit signal during the downlink phase. Such a radio transceiver device 200 is illustrated in FIG. 4. In what follows, the signal bandwidth is set to 20 MHz, the carrier frequency is set to $f_{carrier}$=2.4 GHz. Furthermore, the sampling rate of the signal processing module 310, the ADCs 330, and the DACs 350 has been set to $f_{sam}$=10 GS/s.

The dither signal used in the numerical examples is NSD whose realizations have been drawn randomly from some probability distribution (e.g., uniform, Gaussian, etc.). Hence, the dither signal has not been tailored to the received signal. Only the power of the dither signal has been optimized for each value of SNR. Better performance can be achieved by jointly optimizing the dither signal and the power level and/or by considering SD that may be dependent on previous samples of the received signal.

Figure 6:
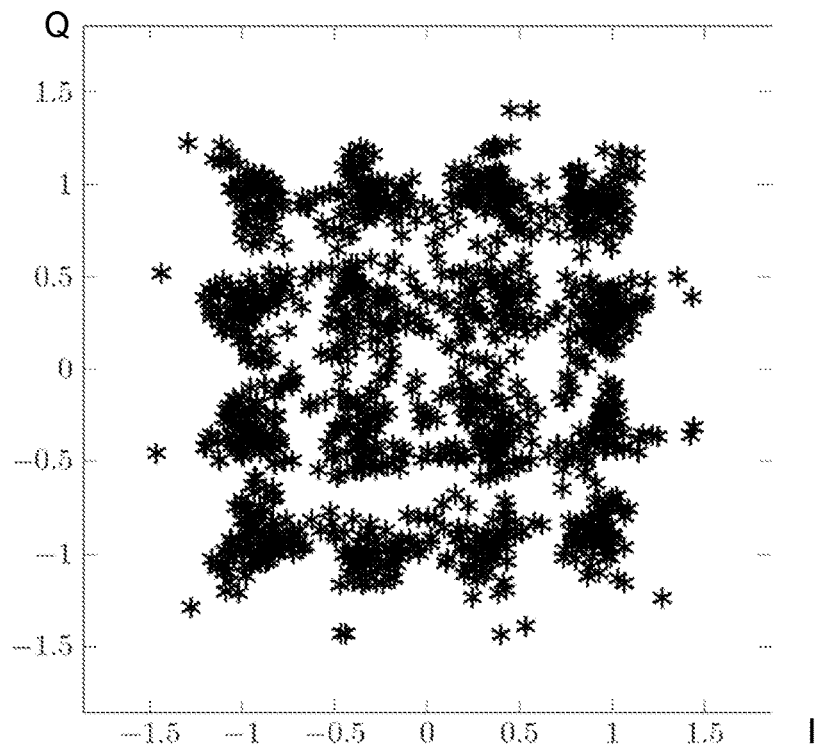
FIGS. 6, 7, 8, 9, 10, 11 show performance results according to embodiments.
Figure 7:
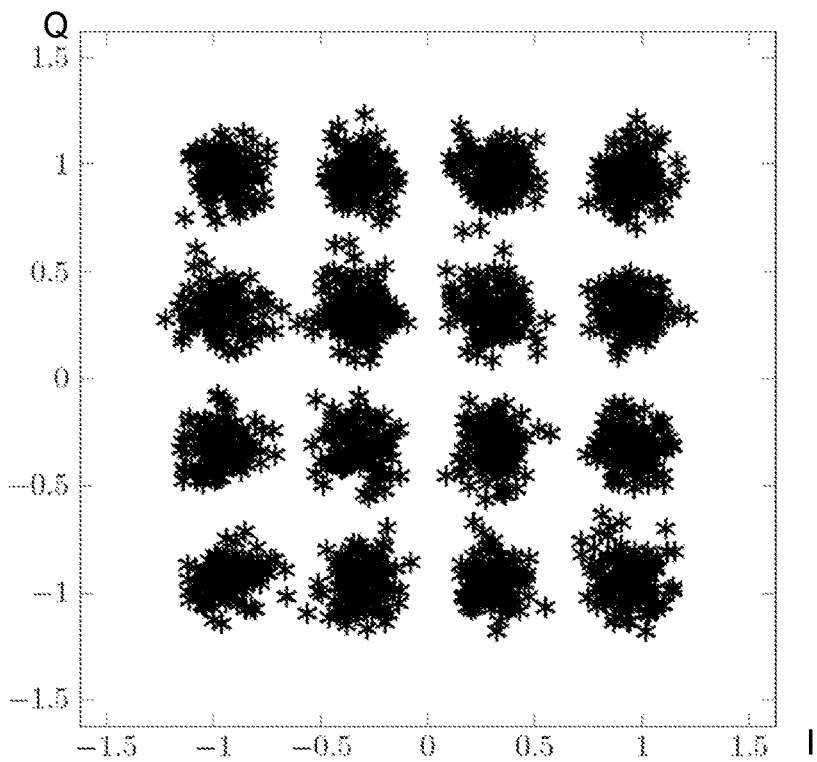

In FIG. 6 and FIG. 7 are shown, for the SISO case and for the case of an additive white Gaussian noise (AWGN) channel, the received constellations for the cases of 16-QAM with and without the proposed radio transceiver device 200 and with SNR=30 dB. The constellation points of the transmitted signal are given by {±0.316, ±0.950} for each of the I component and the Q component [Inventors: please fill in the values]. For the results in this figure has been assumed a dither signal drawn from a uniform binary distribution, which can be generated, e.g., using a radio transceiver device 200 in which the possible 1-bit DAC outputs are limited to two levels. The proposed radio transceiver device 200 yields a more discernable 16-QAM constellation compared to the state of the art.

Figure 8:
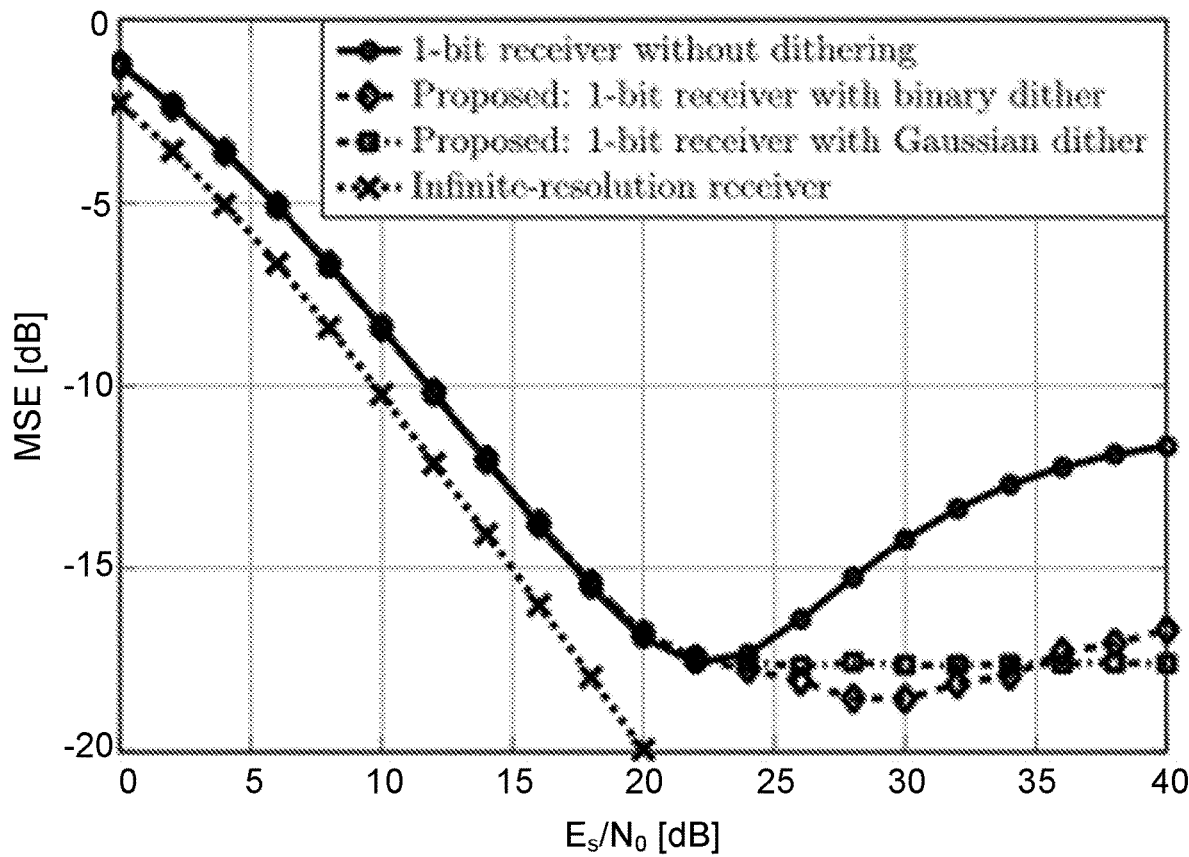

In FIG. 8 is shown the mean squared error (MSE) of the received symbols for an assumed transmitted sequence of 16-QAM symbols over a SISO additive white Gaussian noise (AWGN) channel with and without the proposed radio transceiver device 200 as a function of SNR. The SNR is given by $E_s/N_o$, where $E_s$ is the symbol power and $N_o$ is the receiver noise power. For the results in this figure has been assumed a dither signal drawn from a uniform binary distribution and a Gaussian distribution, respectively. The MSE resulting from the proposed radio transceiver device 200, despite suboptimal choices for the dither signal, outperforms the state of the art in the high-SNR regime.

Figure 9:
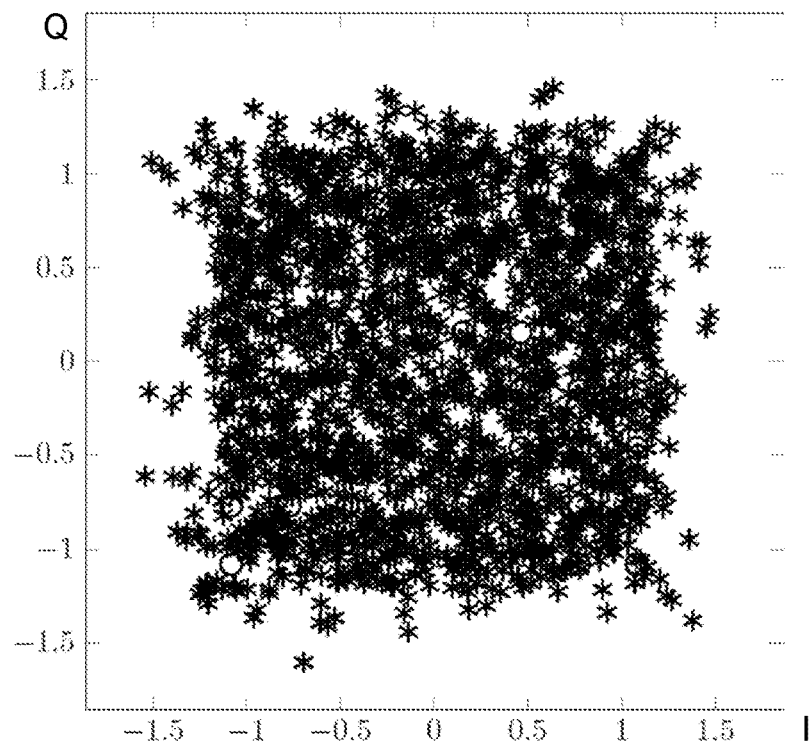
Figure 10:
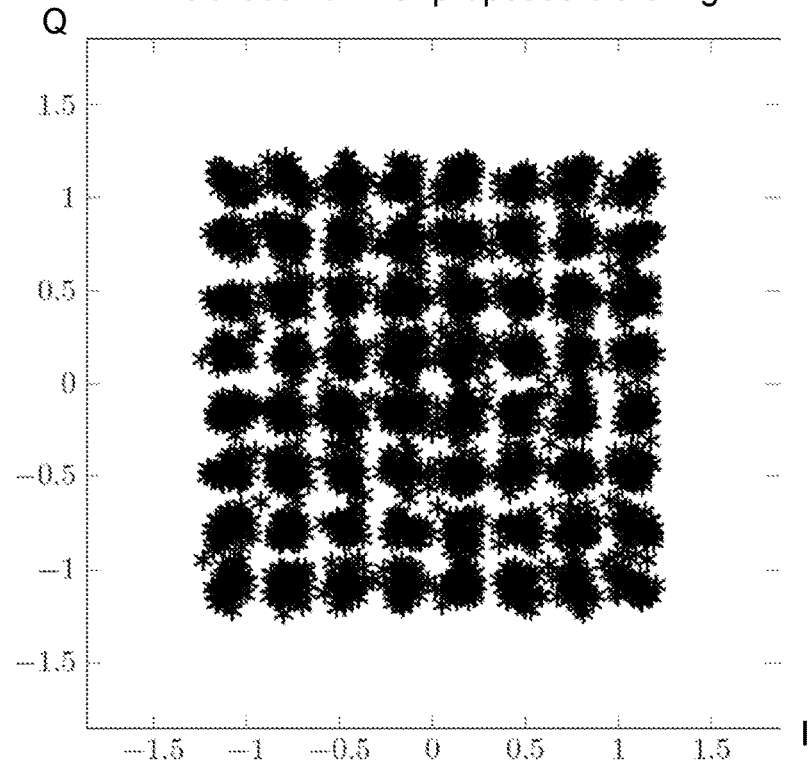

In FIG. 9 and FIG. 10 are shown, for the 1-by-12 single-input multiple-output (SIMO) case (i.e., a single transmit antenna and 12 receive antennas) and for the case of a Rayleigh fading channel, the received constellation for the cases of 64-QAM with and without the proposed radio transceiver device 200 and with SNR=30 dB. The constellation points of the transmitted signal are given by {±0.154, 10.463, +0.772, ±1.08} for each of the I component and the Q component [Inventors: please fill in the values]. For the results in this figure has been assumed a dither signal drawn from a uniform binary distribution [Inventors: is this correct?], which can be generated, e.g., using a radio transceiver device 200 in which the possible 1-bit DAC outputs are limited to two levels. The proposed radio transceiver device 200 yields a more discernable 16-QAM constellation compared to the state of the art.

Figure 11:
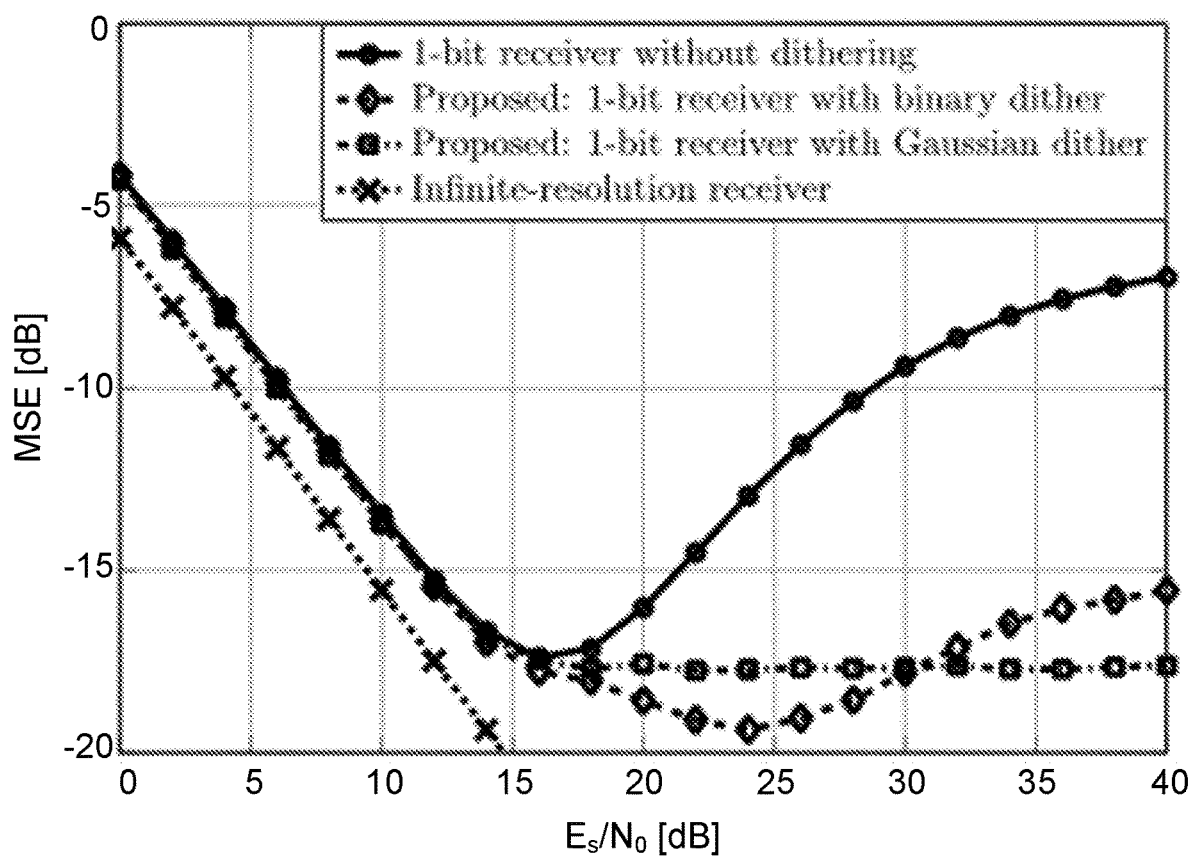

In FIG. 11 is shown the MSE of the received symbols for an assumed transmitted sequence of 64-QAM symbols over a 1-by-12 SIMO Rayleigh-fading channel with and without the proposed radio transceiver device 200 as a function of SNR. The SNR is given by $E_s/N_o$, where $E_s$ is the symbol power and $N_o$ is the receiver noise power. For the results in this figure has been assumed a dither signal drawn from a uniform binary distribution and a Gaussian distribution, respectively. The MSE resulting from the proposed radio transceiver device 200, despite suboptimal choices for the dither signal, outperforms the state of the art in the high-SNR regime.

Figure 12:
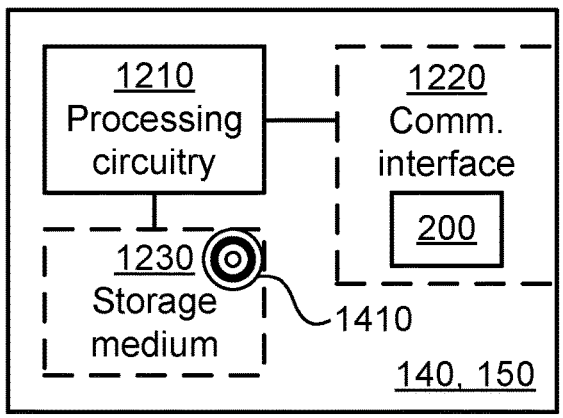
FIG. 12 is a schematic diagram showing functional units of a communication device, according to an embodiment.

FIG. 12 schematically illustrates, in terms of a number of functional units, the components of a communication device 140a, 150, such as a radio access network node 140 or terminal device 150 according to an embodiment. Processing circuitry 1210 is provided using any combination of one or more of a suitable central processing unit (CPU), multi-processor, microcontroller, digital signal processor (DSP), etc., capable of executing software instructions stored in a computer program product 1410 (as in FIG. 14), e.g. in the form of a storage medium 1230. The processing circuitry 1210 may further be provided as at least one application specific integrated circuit (ASIC), or field programmable gate array (FPGA).

Particularly, the processing circuitry 1210 is configured to cause the communication device 140, 150 to perform a set of operations, or steps, as disclosed above. For example, the storage medium 1230 may store the set of operations, and the processing circuitry 1210 may be configured to retrieve the set of operations from the storage medium 1230 to cause the communication device 140, 150 to perform the set of operations. The set of operations may be provided as a set of executable instructions.

Thus the processing circuitry 1210 is thereby arranged to execute methods as herein disclosed. The storage medium 1230 may also comprise persistent storage, which, for example, can be any single one or combination of magnetic memory, optical memory, solid state memory or even remotely mounted memory. The communication device 140, 150 may further comprise a communications interface 1220 at least configured for communications with another communication device, function, node, or entity. As such the communications interface 1220 may comprise one or more transmitters and receivers, comprising analogue and digital components. In particularly, the communications interface 1220 comprises a radio transceiver device 200 according to any of the above embodiments.

The processing circuitry 1210 controls the general operation of the communication device 140, 150 e.g. by sending data and control signals to the communications interface 1220 and the storage medium 1230, by receiving data and reports from the communications interface 1220, and by retrieving data and instructions from the storage medium 1230. Other components, as well as the related functionality, of the communication device 140, 150 are omitted in order not to obscure the concepts presented herein.

Figure 13:
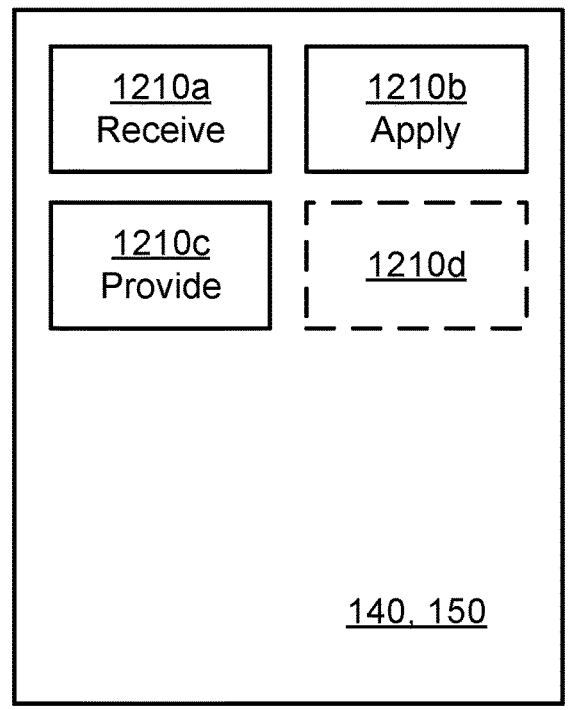
FIG. 13 is a schematic diagram showing functional modules of a communication device according to an embodiment.

FIG. 13 schematically illustrates, in terms of a number of functional modules, the components of a communication device 140, 150 according to an embodiment. The communication device 140, 150 of FIG. 13 comprises a number of functional modules; a receive module 1210a configured to perform step S102, an apply module 1210b configured to perform step S104, and a provide module 1210c configured to perform step S106. The communication device 140, 150 of FIG. 13 may further comprise a number of optional functional modules, as represented by functional module 1210d. In general terms, each functional module 1210a-1210d may in one embodiment be implemented only in hardware and in another embodiment with the help of software, i.e., the latter embodiment having computer program instructions stored on the storage medium 1230 which when run on the processing circuitry makes the communication device 140, 150 perform the corresponding steps mentioned above in conjunction with FIG. 13. It should also be mentioned that even though the modules correspond to parts of a computer program, they do not need to be separate modules therein, but the way in which they are implemented in software is dependent on the programming language used. Preferably, one or more or all functional modules 1210a-1210d may be implemented by the processing circuitry 1210, possibly in cooperation with the communications interface 1220 and/or the storage medium 1230. The processing circuitry 1210 may thus be configured to from the storage medium 1230 fetch instructions as provided by a functional module 1210a-1210d and to execute these instructions, thereby performing any steps as disclosed herein.

Figure 14:
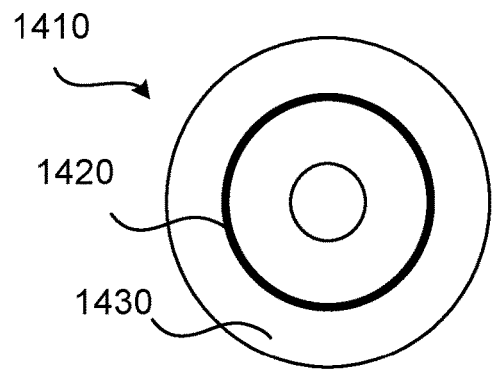
FIG. 14 shows one example of a computer program product comprising computer readable storage medium according to an embodiment.

FIG. 14 shows one example of a computer program product 1410 comprising computer readable storage medium 1430. On this computer readable storage medium 1430, a computer program 1420 can be stored, which computer program 1420 can cause the processing circuitry 210 and thereto operatively coupled entities and devices, such as the communications interface 220 and the storage medium 230, to execute methods according to embodiments described herein. The computer program 1420 and/or computer program product 1410 may thus provide means for performing any steps as herein disclosed.

In the example of FIG. 14, the computer program product 1410 is illustrated as an optical disc, such as a CD (compact disc) or a DVD (digital versatile disc) or a Blu-Ray disc. The computer program product 1410 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420 is here schematically shown as a track on the depicted optical disk, the computer program 1420 can be stored in any way which is suitable for the computer program product 1410.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A radio transceiver device comprising:
   an antenna;
   a signal processing module;
   a receiver chain configured to receive a first signal from the antenna, the receiver chain extending from the antenna to the signal processing module and comprising:
   i) a first part that receives the first signal,
   ii) a second part that receives an output of the first part, the second part comprising a mixer or combiner, and
   iii) a third part comprising an analog-to-digital converter (ADC) for receiving an output of the second part; and
   a transmitter chain configured to receive a digital signal from the signal processing module, the transmitter chain extending from the signal processing module to the antenna and comprising:
   i) a first part comprising a digital-to-analog converter (DAC) that receives the digital signal from the signal processing module and produces an analog dither signal and
   ii) a second part that receives the dither signal and that is connected to the antenna; and
   a connecting circuit connecting the receiver chain with the transmitter chain, wherein
   the dither signal produced by the DAC is provided to an input of the connecting circuit,
   an output of the connecting circuit is connected to an input of the mixer or combiner,
   the mixer mixes the output of the connecting circuit with the output of the first part of the receiver chain to produce a mixed signal or the combiner combines the output of the connecting circuit with the output of the first part of the receiver chain to produce a combined signal, and
   the mixed signal or the combined signal is provided to the ADC of the receive chain, wherein
   the connecting circuit comprises a filter for filtering the dither signal to produce a filtered signal,
   the filtered signal is the output signal output from the connecting circuit,
   the filter for filtering the dither signal is a low-pass filter, a high-pass filter, a band-pass filter, or a band-stop filter, and
   the filter for filtering the dither signal has a filter response that is dependent on properties of the first signal from the antenna.

2. The radio transceiver device of claim 1, wherein
   the connecting circuit comprises a signal power adjuster configured to adjust the power of the dither signal produced by the DAC to produce a power adjusted signal, and
   the power adjust signal is the output signal output from the connecting circuit.

3. The radio transceiver device of claim 2, wherein the dither signal is power adjusted as a function of the power of the first signal.

4. The radio transceiver device of claim 1, wherein application of the ADC results in samples of a signal being produced, wherein the radio transceiver device implements a feedback mechanism, and wherein the dither signal is, via the feedback mechanism, made dependent on previous samples of the signal.

5. The radio transceiver device of claim 1, wherein the dither signal represents subtractive dither or non-subtractive dither.

6. The radio transceiver device of claim 1, wherein the DAC is configured to generate the dither signal by performing digital-to-analog conversion of an auxiliary signal being fed to the DAC in the transmitter chain.

7. The radio transceiver device of claim 1, wherein the ADC comprises a comparator with differential input ports, and wherein the dither signal is fed to one of the differential input ports.

8. The radio transceiver device of claim 1, wherein the first signal as received from the antenna by the receiver chain is in the radio frequency domain, and wherein the dither signal is applied to the output of the first part of the receiver chain in the radio frequency domain.

9. The radio transceiver device of claim 1, wherein the first signal as received from the antenna by the receiver chain is in the radio frequency domain, the radio transceiver device further comprising:
an intermediate frequency mixer configured to convert the first signal from the radio frequency domain to intermediate frequency domain.

10. The radio transceiver device of claim 1, wherein the first signal as received from the antenna by the receiver chain is in the radio frequency domain, the radio transceiver device further comprising:
a radio frequency mixer configured to convert the first signal from the radio frequency domain to baseband frequency domain.

11. The radio transceiver device of claim 1, wherein
the first part of the receiver chain comprises a low noise amplifier that amplifies the first signal to produce an amplified signal, and
the amplified signal is the output of the first part of the receiver chain.

12. The radio transceiver device of claim 1, wherein
the second part of the receiver chain comprises the combiner,
the combiner combines the output of the connecting circuit with the output of the first part of the receiver chain to produce a combined signal, and
the combined signal is provided to the ADC of the receive chain.

13. The radio transceiver device of claim 1, wherein
the second part of the receiver chain comprises the mixer,
the mixer mixes the output of the connecting circuit with the output of the first part of the receiver chain to produce a mixed signal, and
the mixed signal is provided to the ADC of the receive chain.

14. The radio transceiver device of claim 1, wherein the radio transceiver device is configured for time division multiplexing (TDD) operation such that no signal representing a message to be transmitted is provided to the antenna when the first signal is provided to the signal processing module, and vice versa.

15. The radio transceiver device of claim 1, wherein the radio transceiver device is configured for frequency division multiplexing (FDD) operation such that the digital signal is provided to the antenna when the first signal is provided to the signal processing module.

16. A radio access network node comprising the radio transceiver device of claim 1.

17. A terminal device comprising the radio transceiver device of claim 1.

* * * * *